(12) United States Patent
Xue

(10) Patent No.: US 11,334,369 B2
(45) Date of Patent: May 17, 2022

(54) APPLICATION LAUNCHING METHOD AND DEVICE

(71) Applicant: XI'AN ZHONGXING NEW SOFTWARE CO., LTD., Shaanxi (CN)

(72) Inventor: Tao Xue, Guangdong (CN)

(73) Assignee: XI'AN ZHONGXING NEW SOFTWARE CO., LTD.

( * ) Notice: Subject to any disclaimer, the term of this patent is extended or adjusted under 35 U.S.C. 154(b) by 103 days.

(21) Appl. No.: 16/476,320

(22) PCT Filed: Nov. 24, 2017

(86) PCT No.: PCT/CN2017/112896
§ 371 (c)(1),
(2) Date: Jul. 8, 2019

(87) PCT Pub. No.: WO2018/126816
PCT Pub. Date: Jul. 12, 2018

(65) Prior Publication Data
US 2019/0347108 A1    Nov. 14, 2019

(30) Foreign Application Priority Data

Jan. 6, 2017    (CN) .......................... 201710011183.0

(51) Int. Cl.
*G06F 9/445*    (2018.01)
(52) U.S. Cl.
CPC .................................. *G06F 9/445* (2013.01)

(58) Field of Classification Search
CPC ..... G06F 9/445; G06T 3/40; G09G 2330/026; G09G 2340/04
See application file for complete search history.

(56) References Cited

U.S. PATENT DOCUMENTS

| 2008/0077491 A1* | 3/2008 | Robinson | G06F 9/4401 |
| | | | 705/14.64 |
| 2011/0181574 A1* | 7/2011 | Champion | G09G 3/025 |
| | | | 345/211 |

FOREIGN PATENT DOCUMENTS

| CN | 101526905 A | | 9/2009 |
| CN | 101976170 A | | 2/2011 |
| CN | 105812858 A | | 7/2016 |
| CN | 105812933 A | * | 7/2016 |
| CN | 105812933 A | | 7/2016 |

OTHER PUBLICATIONS

Translation of International Search Report dated Sep. 28, 2017; International Patent Application No. PCT/CN2017/1 12896 filed Nov. 24, 2017. ISA/CN.

* cited by examiner

*Primary Examiner* — Dong U Kim
(74) *Attorney, Agent, or Firm* — McDonald Hopkins LLC

(57) ABSTRACT

An application launching method and device. The method includes: receiving a launching instruction for launching a specified application; and launching the specified application according to the launching instruction, and displaying, in a process of launching the specified application, a picture corresponding to at least one stage of the process.

10 Claims, 3 Drawing Sheets

APPLICATION LAUNCHING METHOD AND DEVICE

CROSS-REFERENCE TO RELATED APPLICATION

This application is a 35 U.S.C. 371 national stage filing of PCT Application No. PCT/CN2017/112896 filed on Nov. 24, 2017, which claims priority to Chinese Patent Application No. 201710011183.0, filed on Jan. 6, 2017, each of which are incorporated herein in their entirety by reference.

TECHNICAL FIELD

The present disclosure relates to the field of communications and, for example, to an application launching method and device.

BACKGROUND

With the development of science and technology, more and more attention is paid to user experience when some applications in a terminal are launched. Many applications have a long launching period and a simple picture when being launched, thereby affecting the user experience. For example, a laser light machine is generally adopted in a projector. The laser light machine is activated at a low speed, which lasts about 11 s. Different light machines have inconsistent activation states, and activation time differs a lot between individual light machines. The projector is generally provided with a display screen with a predetermined inch (for example, 8.4 inches). When a user clicks a switch of the light machine for projection, the user cannot acquire the current launching state of the projector, and sometimes the user repeatedly clicks the switch of the light machine, which causes an error of the launching state of the light machine. Moreover, since the laser light machines have inconsistent activation states, if a boot animation is loaded in a loading manner (such as a boot animation of a mobile phone) in the related art, the user needs to wait for the projector to display the picture for a relatively long time and the user cannot effectively acquire a launching progress of the projector, resulting in poor user experience.

SUMMARY

The present disclosure provides an application launching method and device, which may solve the problem in the related art that user experience is poor because a user cannot acquire a launching progress of an application when the application has a long launching period.

The present disclosure provides an application launching method. The method includes receiving a launching instruction for launching a specified application; and launching the specified application according to the launching instruction, and displaying, in a process of launching the specified application, a picture corresponding to at least one stage of the process.

Optionally, displaying, in the process of launching the specified application, the picture corresponding to the at least one stage of the process includes determining, according to time of each of stages of the process, a picture corresponding to each of the stages of the process; and displaying pictures corresponding to the stages of the process in order in the process of launching the specified application.

Optionally, determining, according to the time of each of the stages of the process, the picture corresponding to each of the stages of the process includes in response to determining that time of a stage is less than or equal to a preset threshold, determining that a static picture corresponds to the stage; in response to determining that the time of the stage is greater than the preset threshold, determining that a dynamic picture corresponds to the stage.

Optionally, the method further includes adjusting, according to the time of the stage, a display of the picture corresponding to the stage, where the time of the stage is time from a starting time point of the stage to a starting time point of a next stage.

Optionally, adjusting, according to the time of the stage, the display of the picture corresponding to the stage includes in response to determining that the time of the stage is less than preset display time of the picture corresponding to the stage, performing at least one of: increasing a display speed of a first partial frame of the picture corresponding to the stage or skipping a second partial frame of the picture corresponding to the stage; in response to determining that the time of the stage is greater than the preset display time of the picture corresponding to the stage, performing at least one of: decreasing a display speed of a third partial frame of the picture corresponding to the stage or displaying a fourth partial frame of the picture corresponding to the stage more than twice.

Optionally, the specified application includes a booting application of a projector.

The present disclosure further provides an application launching device. The device may include a receiving module and a launching module. The receiving module is configured to receive a launching instruction for launching a specified application. The launching module is configured to launch the specified application according to the launching instruction, and display, in a process of launching the specified application, a picture corresponding to at least one stage of the process.

Optionally, the launching module includes a determining unit and a display unit. The determining unit is configured to determine, according to time of each of stages of the process, a picture corresponding to each of the stages of the process. The display unit is configured to display pictures corresponding to the stages of the process in order in the process of launching the specified application.

Optionally, the determining unit is configured to: in response to determining that time of a stage is less than or equal to a preset threshold, determine that a static picture corresponds to the stage; and in response to determining that the time of the stage is greater than the preset threshold, determine that a dynamic picture corresponds to the stage.

Optionally, the device further includes an adjustment module. The adjustment module is configured to adjust, according to the time of the stage, a display of the picture corresponding to the stage, where the time of the stage is time from a starting time point of the stage to a starting time point of a next stage.

Optionally, the adjustment module includes a first processing unit and a second processing unit. The first processing unit is configured to: in response to determining that the time of the stage is less than preset display time of the picture corresponding to the stage, perform at least one of: increasing a display speed of a first partial frame of the picture corresponding to the stage or skipping a second partial frame of the picture corresponding to the stage. The second processing unit is configured to: in response to determining that the time of the stage is greater than the preset display time of the picture corresponding to the stage, perform at least one of: decreasing a display speed of a third partial frame of the picture corresponding to the stage or displaying a fourth partial frame of the picture corresponding to the stage more than twice.

Optionally, the specified application includes a booting application of a projector.

The present disclosure further provides a projector. The projector may include a projection light machine and a controller. The projection light machine is configured to perform a projection display. The controller is configured to receive a launching instruction for launching the projector, launch the projector according to the launching instruction, and control, in a process of launching the projection light machine of the projector, a picture corresponding to at least one stage of the process to be displayed.

Optionally, the controller is configured to determine, according to time of each of stages of the process, a picture corresponding to each of the stages of the process, and control pictures corresponding to the stages of the process to be displayed in order in the process of launching the projection light machine of the projector.

The present disclosure further provides a storage medium, configured to store program codes for executing one of or a combination of the steps described above.

The present disclosure further provides a computer program product including a computer program stored in a non-transient computer-readable storage medium. The computer program includes program instructions which, when executed by a computer, enable the computer to execute any one of the methods described above.

DETAILED DESCRIPTION

The terms "first", "second" and the like in the description, claims and above drawings are used to distinguish similar objects and are not necessarily used to describe a particular order or sequence.

Figure 1:
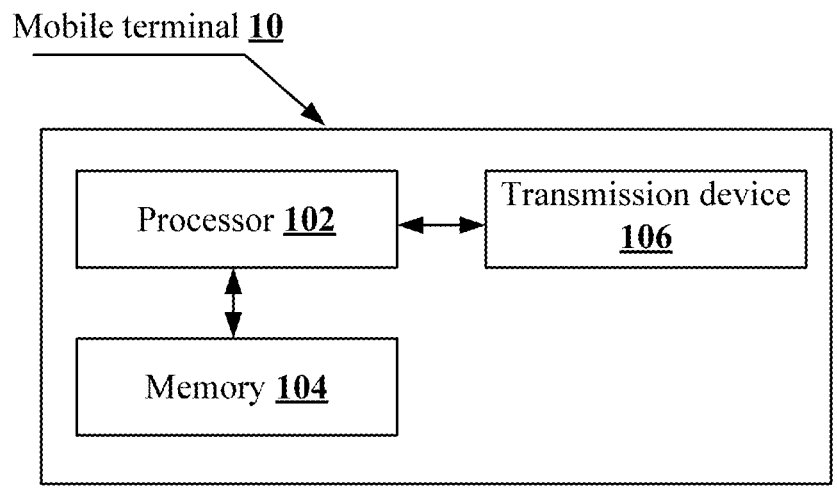
FIG. 1 is a block diagram of hardware of a mobile terminal according to an embodiment.

A method embodiment provided in an embodiment may be executed in a mobile terminal, a computer terminal or other similar computing devices. Taking the method embodiment to be executed in the mobile terminal as an example, FIG. 1 is a block diagram of hardware of a mobile terminal for an application launching method according to this embodiment. As shown in FIG. 1, a mobile terminal 10 may include one or more (only one is shown in FIG. 1) processors 102 (in which the processor 102 may include, but is not limited to, a processing device such as a micro control unit (MCU) or a field-programmable gate array (FPGA)), a memory 104 used for storing data, and a transmission device 106 used for implementing a communication function. The structure shown in FIG. 1 is merely illustrative and not intended to limit the structure of the electronic device described above. For example, the mobile terminal 10 may further include more or fewer components than the components shown in FIG. 1, or may have a configuration different from the configuration shown in FIG. 1.

The memory 104 may be used for storing software programs and modules of application software, such as application instructions or modules corresponding to the application launching method in the embodiment. The processor 102 executes the software programs and modules stored in the memory 104 so as to perform various function applications and data processing, that is, to implement the method described above. The memory 104 may include a high-speed random access memory, and may further include a nonvolatile memory such as one or more magnetic storage devices, flash memories or other nonvolatile solid-state memories. The memory 104 may include memories which are remotely disposed with respect to the processor 102 and these remote memories may be connected to the mobile terminal 10 via a network. Examples of the preceding network include, but are not limited to, the Internet, an intranet, a local area network, a mobile communication network and a combination thereof.

The transmission device 106 is configured to receive or transmit data via a network. Specific examples of the preceding network may include a wireless network provided by a communication provider of the mobile terminal 10. The transmission device 106 may include a network interface controller (NIC), which may be connected to other network equipment via a base station and thus be capable of communicating with the Internet. The transmission device 106 may be a Radio Frequency (RF) module, which is used for communicating with the Internet in a wireless way.

Figure 2:
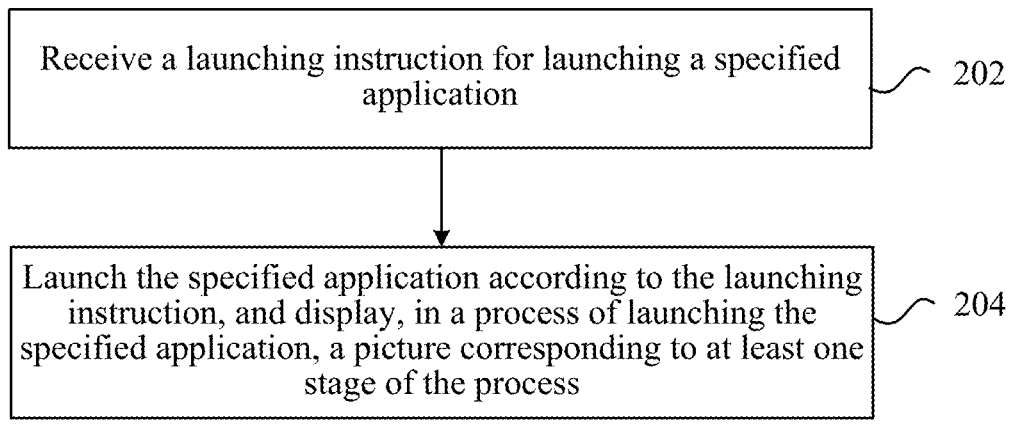
FIG. 2 is a flowchart of an application launching method according to an embodiment.

An application launching method executed in the preceding mobile terminal is provided in an embodiment. FIG. 2 is a flowchart of the application launching method according to this embodiment. As shown in FIG. 2, the method may include steps described below.

In step 202, a launching instruction for launching a specified application is received.

In step 204, the specified application is launched according to the launching instruction, and in a process of launching the specified application, a picture corresponding to at least one stage of the process is displayed.

The specified application is launched after the launching instruction for launching the specified application is received, and in the process of launching the specified application, pictures corresponding to different stages are displayed in the different stages in the specified application, so as to make a user acquire a launching progress of the specified application. The application launching method may solve the problem of poor user experience because the user cannot acquire the launching progress of the application when the specified application has a long launching period, thereby achieving effects of acquiring in time the launching progress of the application when the application is launched by the user and improving user experience.

Optionally, the above steps may be executed by a terminal such as a projector, a mobile phone or a computer, but it is not limited thereto.

Optionally, in the process of launching the specified application, displaying the picture corresponding to the at least one stage of the process includes: according to time of each of stages of the above process, determining a picture corresponding to each of the stages of the process; and displaying pictures corresponding to the stages of the above process in order in the process of launching the above specified application. In the embodiment, the time of a stage may be preset.

Optionally, according to the time of each of the stages of the above process, determining the picture corresponding to each of the stages of the above process includes that: in response to determining that time of a stage is less than or equal to a preset threshold, it is determined that a picture corresponding to the stage is a static picture; in response to determining that the time of the stage is greater than the preset threshold, it is determined that the picture corresponding to the stage is a dynamic picture.

In the embodiment, when the time of the stage is a short period of for example, 1 s to 2 s, the static picture may be displayed; when the time of the stage is a relatively long period of for example, 4 s to 5 s, the dynamic picture may be displayed. For the preset threshold, each stage may correspond to one preset threshold, or all the stages correspond to a same preset threshold.

Generally, when the terminal (for example, the mobile phone) displays a boot picture, a multi-frame animation is simply played at a constant speed, and a static picture is presented to the user after the multi-frame animation is played. After a user interface (UI) can be displayed when bottom layer loading is finished, the static picture is closed and a desktop of the mobile phone is started. Problems about how long the animation is played and when to end the animation are to be determined.

In view of the above problems, the method in the embodiment may further include adjusting a display of the picture corresponding to the stage according to the time of the stage. The time of the stage is time from a starting time point of the stage to a starting time point of a next stage.

In the embodiment, when practical time of displaying the picture at each of the stages is inconsistent with the preset time, the display of the picture corresponding to the stage may be adjusted to increase picture display flexibility.

Optionally, adjusting the display of the picture corresponding to the stage according to the time of the stage includes steps described below. In response to determining that the time of the stage is less than preset display time of the picture corresponding to the stage, a display speed of a first partial frame of the picture corresponding to the stage is increased and/or a second partial frame of the picture corresponding to the stage is skipped. In response to determining that the time of the stage is greater than the preset display time of the picture corresponding to the stage, a display speed of a third partial frame of the picture corresponding to the stage is decreased and/or a fourth partial frame of the picture corresponding to the stage is displayed more than twice.

For example, the time of the current stage is less than the preset display time of the picture corresponding to the current stage. When the current stage ends and a staring time point of a next stage arrives, remaining frames to be displayed of the picture corresponding to the current stage may be taken as the first partial frame and the display speed of the remaining frames is increased (for example, the remaining frames are played within 0.5 s); or the remaining frames, except the last frame, to be displayed are skipped and the last frame of the picture corresponding to the current stage is directly displayed, where the remaining frames, except the last frame, to be displayed are taken as the second partial frame.

For another example, the time of the current stage is greater than the preset display time of the picture corresponding to the current stage, all frames of the picture corresponding to the current stage have been played before the current stage ends. Then, the last frame of the picture corresponding to the current stage may be taken as the third partial frame and the last frame of the picture remains to be displayed until the current stage ends; or partial frames may be selected from the picture corresponding to the current stage as the fourth partial frame and the fourth partial frame is repeatedly played until the current stage ends.

Optionally, the specified application includes a booting application of the projector. In the embodiment, the projector receives an instruction for controlling the projector to be launched. A projection light machine of the projector is launched according to the instruction. Alternatively, a preset initial display picture may also be displayed according to the instruction. In a practical application, the initial display picture may not be set and corresponding pictures are separately displayed according to a launching progress of the projection light machine. The launching progress corresponds to the launching of each stage of a launching process of the projection light machine. The launching process of the projection light machine may sequentially include the following five stages: initializing a laser light source and transmitting laser; splitting the laser into red, green and blue light through a color wheel; homogenizing the red, green and blue light through a fly's eye lens; the homogenized light entering into a digital micromirror device (DMD) chip to be processed; and after the processing by the DMD chip, forming an imaging light ray and transmitting the imaging light ray through a lens to form an image. Applications in different terminals may have different stages when being launched.

The projector in the embodiment may include at least one of: a projection light machine device, a display screen device and a control device. The projection light machine device may include a laser light source or a light emitting diode (LED) light source, a color wheel (optional), a lens, a beam splitter, a fly's eye lens, a light reflector, a DMD chip, and the like. the display screen and control device may include a touch display screen, an operation key, and the like.

Launching control steps of the projector in the embodiment are described below.

In a first step, the user clicks a projector switch on a touch screen, or the user clicks a physical projection switch on the projector.

In a second step, after receiving the instruction for projection launching, the control device starts to launch a projection light source and simultaneously notifies the display screen to start displaying an animation.

In a third step, the control device notifies the display screen to play a corresponding animation at every key stage of the whole process of the projection launching.

In a fourth step, when the projection launching is finished, that is, when a picture is projected, the animation of the display screen is stopped and the picture is projected.

Figure 3:
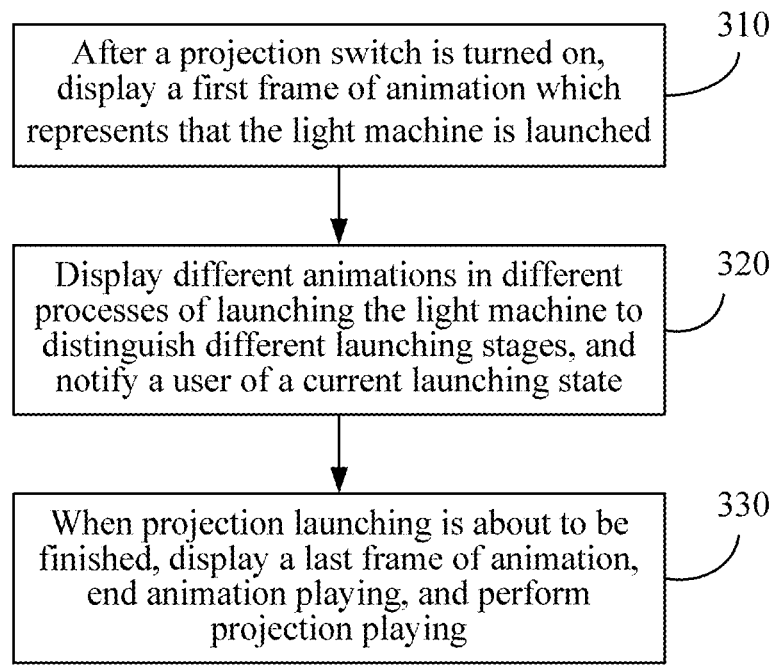
FIG. 3 is a flowchart of a method for controlling projection launching according to an embodiment.

FIG. 3 is a flowchart of a method for controlling projection launching according to the embodiment. As shown in FIG. 3, the method includes steps described below.

In step 310, after a projection switch is turned on, the display screen of the projector displays a first frame of animation, which represents that the light machine is launched.

In step 320, different animations are displayed in different processes of launching the light machine to distinguish different launching stages and notify the user of a current launching state.

In step 330, when the projection launching is about to be finished, a last frame of animation is displayed on the display screen of the projector, and after the last frame is displayed, the animation stops being played and projection playing is performed simultaneously.

The projection switch in step 310 may be a software switch provided by a UI interface on the touch screen, a hardware projection switch of the projector, a touch switch of the projector, or a projection switch on a remote controller. The remote controller may be function in an infrared, Bluetooth or wireless fidelity (WIFI) direct manner. The first frame of animation in step 310 may be an animation abstracted by a light source transmitter of the laser light source, an animation abstracted by a light source of a single-color LED or a three-color LED, or other types of animations.

In step 320, different light machines have different launching processes. A brief launching process of a laser light machine may include the following parts: initializing the laser light source and transmitting the laser; splitting the laser into the red, green and blue light through the color wheel; homogenizing the red, green and blue light through the fly's eye lens; the homogenized light entering into a digital micromirror device (DMD) chip to be processed; and after the processing by the DMD chip, forming the imaging light ray and transmitting the imaging light ray through the lens to form the image. A brief launching process of an LED light machine may include the following parts: initializing the three-color LED light source and transmitting a three-color light; splitting the three-color light with the light splitter and performing a homogenization process with the fly's eye lens; the homogenized light entering into the DMD chip to be processed; and after the processing of the DMD chip, forming the imaging light ray and transmitting the imaging light ray through the lens to form the image. Different stages of the process of launching the light machine correspond to different time periods, and the processing of the DMD chip generally occupies a longest time period. A corresponding animation may be displayed according to the time of each stage.

Optionally, different animation schemes may be selected according to different lengths of launching time of the light machine. If the time is within a range of 1 s~2 s, a frame of a static picture may be selected for display or no animation is displayed. If the time is within a range of 3 s~5 s, animations in the whole process of launching the light machine may be evenly played. If the time is within a range of 5 s~8 s, the time period of the whole process of launching the light machine may be equally divided according to the number of frames of pictures of all stages in the whole process of launching, and the animation corresponding to each portion is played for the same time period. If the time is more than 8 s, animations corresponding to different stages are played for different time periods according to time spent on the different stages in the whole process of launching the light machine. When the launching time is more than 8 s, launching consistency of the light machine is further to be considered. A starting time point, an ending time point and a display speed for playing the animations are adjusted according to different launching time periods of different launching stages of different light machines. The following operations may be performed on some portions of animations: playing at a faster speed, playing at a slower speed, skipping a part of frames, or playing a last frame directly without playing the animation at this stage. For example, according to time periods of different processes of different light machines, an animation playing duration for each stage may be acquired from a bottom layer of a system. When a stage starts, information about starting time periods needs to be reported to the system. A difference between the starting time periods of two stages is a total animation playing duration at this stage, and the animation playing may be adjusted according to the total animation playing duration and the number of frames of the animation to be played at this stage.

A starting time stamp of each stage may be recorded on a terminal such as the projector described above. Generally, time of a projection system is based on Greenwich time (for example, 12:00:00 AM GMT, Jan. 1, 1970). A long int time data (in milliseconds (ms)) is added to generate playing time of a current animation. For time recording, a complete amount of time is not required to be recorded, and only the long int data for each stage is required to be recorded, for example, the long int data of 15:12, Mar. 24, 2016 is 1458803528659.

Assuming that a starting time stamp for processing the homogenized light with the DMD chip is 1458803528659 and a time stamp after the processing of the DMD chip is finished is 1458803535004, a total DMD processing duration is 6345 ms, a result of 1458803528659 subtracted from 1458803535004. An animation for the DMD processing is played within 6345 ms. If a total number of frames of the animation is 10, each frame is played for 634.5 ms, a result of 6345 ms divided by 10. If a launching consistency problem of the light machine exists, that is, a DMD processing duration is shorter than 6345 ms, when the projection system receives information that the DMD processing is finished, an animation frame to be played may be skipped and a last animation frame of the current stage is directly played, or a display speed of the animation frame is increased to play the animation frame to be played at the current stage within a certain period of time, for example, 0.5 s. If the DMD processing duration is longer than 6345 ms, the system stops playing animation frames of a next stage after the last animation frame of the current stage is played until the information that the DMD processing is finished is received; or the animation at the DMD processing stage continues to be circularly played until the information that the DMD processing is finished is received, and then an animation of the next stage is played. Animation playing processing manners at other stages is the same as a principle of the preceding example, and the description thereof is omitted.

In step 330, the last frame of animation for finishing the launching may be an animation representing light emission. When the light in the animation emits out a top edge of the display screen, the animation ends and the projection starts.

The methods in the embodiment described above may be implemented by software plus a general-purpose hardware platform, or may of course be implemented by hardware, but in many cases, the former is a preferred implementation mode. This embodiment may be embodied in the form of a software product. The computer software product is stored in a storage medium (such as a read only memory (ROM)/random access memory (RAM), a magnetic disk or an optical disk) and includes several instructions for enabling terminal equipment (which may be a mobile phone, a computer, a server, network equipment or the like) to execute the methods in this embodiment.

This embodiment further provides an application launching device. The device may execute the application launching method according to the embodiment described above. What has been described will not be repeated. As used below, a term "module" may be software, hardware or a combination thereof capable of implementing predetermined functions. The device in the embodiment described below is preferably implemented by software, but implementation by hardware or by a combination of software and hardware is also possible and conceived.

Figure 4:
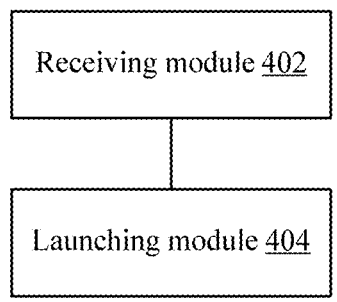
FIG. 4 is a block diagram of an application launching device according to an embodiment.

FIG. 4 is a block diagram of an application launching device according to this embodiment. As shown in FIG. 4, the device may include a receiving module 402 and a launching module 404.

The receiving module 402 is configured to receive a launching instruction for launching a specified application. The launching module 404 is connected to the receiving module 402 and configured to launch the specified application according to the launching instruction, and display, in a process of launching the specified application, a picture corresponding to at least one stage of the process.

Figure 5:
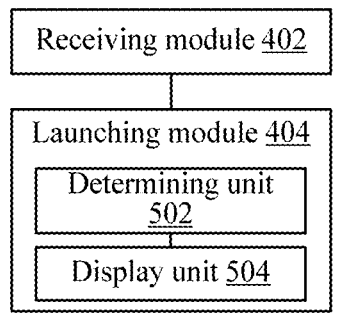
FIG. 5 is a block diagram of a launching module of an application launching device according to an embodiment.

Optionally, FIG. 5 is a block diagram of the launching module 404 of the application launching device according to this embodiment. As shown in FIG. 5, the launching module 404 may include a determining unit 502 and a display unit 504.

The determining unit 502 is configured to determine, according to time of each of stages of the process, a picture corresponding to each of the stages of the process. The display unit 504 is connected to the determining unit 502 and configured to display pictures corresponding to the stages of the process in order in the process of launching the specified application.

Optionally, the determining unit 502 is configured to: in response to determining that time of a stage is less than or equal to a preset threshold, determine that a static picture corresponds to the stage; and in response to determining that the time of the stage is greater than the preset threshold, determine that a dynamic picture corresponds to the stage.

Figure 6:
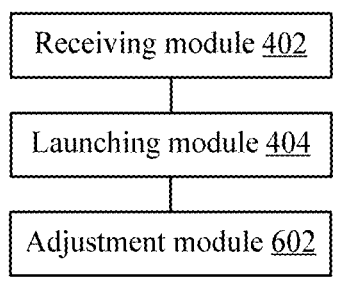
FIG. 6 is a block diagram of an application launching device according to an embodiment.

Optionally, FIG. 6 is a block diagram of the application launching device according to this embodiment. As shown in FIG. 6, the device may further include an adjustment module 602. The adjustment module 602 is configured to adjust, according to the time of the stage, a display of the picture corresponding to the stage. The time of the stage is time from a starting time point of the stage to a starting time point of a next stage.

Figure 7:
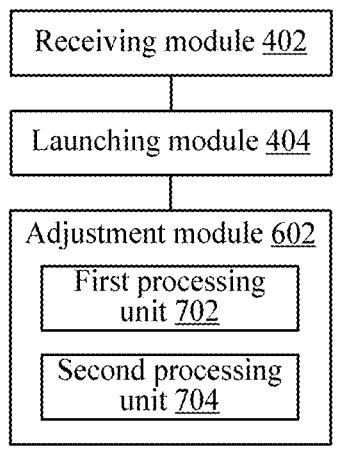
FIG. 7 is a block diagram of an adjustment module of an application launching device according to an embodiment.

Optionally, FIG. 7 is a block diagram of the adjustment module 602 of the application launching device according to this embodiment. As shown in FIG. 7, the adjustment module 602 may include a first processing unit 702 and/or a second processing unit 704.

The first processing unit 702 is configured to: in response to determining that the time of the stage is less than preset display time of the picture corresponding to the stage, increase a display speed of a first partial frame of the picture corresponding to the stage and/or skip a second partial frame of the picture corresponding to the stage. The second processing unit 704 is configured to: in response to determining that the time of the stage is greater than the preset display time of the picture corresponding to the stage, decrease a display speed of a third partial frame of the picture corresponding to the stage and/or display a fourth partial frame of the picture corresponding to the stage more than twice.

Optionally, the specified application includes a booting application of a projector.

This embodiment further provides a projector. The projector may include a projection light machine and a controller. The projection light machine is configured to perform a projection display. The controller is configured to receive a launching instruction for launching the projector, launch the projector according to the launching instruction, and control, in a process of launching the projection light machine of the projector, a picture corresponding to at least one stage of the process to be displayed. In this embodiment, the controller may include the receiving module 402, the launching module 404 and the adjustment module 602.

Optionally, the controller is configured to determine, according to time of each of stages of the process, a picture corresponding to each of the stages of the process, and control pictures corresponding to the stages of the process to be displayed in order in the process of launching the projection light machine of the projector.

One or more modules described above may be implemented by software or hardware. Implementation by hardware may, but may not necessarily, be performed in the following manner: the one or more modules described above are located in a same processor or multiple modules described above are located in their respective processors in any combination form.

This embodiment further provides a storage medium. Optionally, in this embodiment, the storage medium may be configured to store program codes for executing the method steps in the embodiments described above.

Optionally, in this embodiment, the storage medium may include, but is not limited to, a USB flash disk, a read-only memory (ROM), a random access memory (RAM), a mobile hard disk, a magnetic disk, an optical disk or another medium capable of storing program codes.

Optionally, in this embodiment, a processor executes the steps of the application launching method described above according to the program codes stored in the storage medium.

For examples in this embodiment, reference may be made to the examples described in the above-mentioned embodiments, which will not be repeated in this embodiment.

The one or more modules or steps in the embodiments described above may be implemented by a general-purpose computing device. The modules or steps may be concentrated on a single computing device or distributed on a network composed of multiple computing devices. Alternatively, the modules or steps may be implemented by program codes executable by the computing device so that the modules or steps may be stored in a storage device and executed by the computing device. In some circumstances, the illustrated or described steps may be executed in sequences different from those described herein, or the modules or steps may be made into multiple integrated circuit modules separately, or multiple modules or steps therein may be made into a single integrated circuit module for implementation. In this way, this embodiment is not limited to any particular combination of hardware and software.

Logic instructions in the storage medium described above may be implemented in the form of a software function unit and, when sold or used as an independent product, may be stored in a computer-readable storage medium. The present disclosure may be embodied in the form of a computer software product. The computer software product may be stored in a storage medium and includes several instructions for enabling computer equipment (which may be a personal computer, a server, network equipment, or the like) to execute all or part of the steps of the methods according to the embodiments of the present disclosure.

What is claimed is:
1. An application launching method, comprising:
receiving a launching instruction for launching a specified application; and launching the specified application according to the launching instruction; and displaying, in a process of launching the specified application, animations according to display schemes corresponding to a plurality of stages of the process, wherein different animations are displayed according to different display schemes corresponding to different stages of the plurality of stages for a user to distinguish the different stages of the plurality of stages, and a display scheme for each stage is determined in response to launching time of each of the plurality of stages, wherein the launching time of each of the plurality of stages is time from a starting time point of a stage to a starting time point of a next stage;

wherein displaying, in the process of launching the specified application, the animations according to display schemes corresponding to the plurality of stages of the process comprises:

determining, according to the launching time of each of the plurality of stages of the process, the display schemes corresponding to each of the plurality of stages of the process; and displaying the animations according to the determined display schemes corresponding to each of the plurality of stages of the process in order in the process of launching the specified application; and wherein the determining, according to the launching time of each of the plurality of stages of the process, the display schemes corresponding to each of the plurality of stages of the process comprises: in response to determining that launching time of a first stage is less than or equal to a preset threshold, determining that a first display scheme corresponds to the first stage, and displaying a first picture according to the first display scheme; and in response to determining that launching time of a second stage is greater than the preset threshold, determining that a second display scheme corresponds to the second stage, and displaying a second animation according to the second display scheme.

2. The method of claim 1, further comprising: adjusting, according to the launching time of each of the plurality of stages, the display schemes corresponding to each of the plurality of stages.

3. The method of claim 2, wherein the adjusting, according to the launching time of each of the plurality of stages, the display schemes corresponding to each of the plurality of stages, comprises:

in response to determining that launching time of a third stage is less than preset display time of a third animation according to a third display scheme corresponding to the third stage, performing at least one of: increasing a display speed of a first plurality of picture frames of the third animation corresponding to the third stage or skipping a second plurality of picture frames of the third animation corresponding to the third stage; and in response to determining that launching time of a fourth stage is greater than preset display time of a fourth animation according to a fourth display scheme corresponding to the fourth stage, performing at least one of: decreasing a display speed of a third plurality of picture frames of the fourth animation corresponding to the fourth stage or repeating displaying a fourth plurality of picture frames of the fourth animation corresponding to the fourth stage.

4. The method of claim 1, wherein the specified application comprises a booting application of a projector.

5. An application launching device, comprising:

a memory, which is configured to store instructions;

a transmission device, configured to receive a launching instruction for launching a specified application; and a processor, configured to execute the instructions stored in the memory to:

launch the specified application according to the launching instruction, and display, in a process of launching the specified application, animations according to display schemes corresponding to a plurality of stages of the process, wherein different animations are displayed according to different display schemes to different stages of the plurality of stages for a user to distinguish the different stages of the plurality of stages, and a display scheme for each stage is determined in response to launching time of each of the plurality of stages, wherein the launching time of each of the plurality of stages is time from a starting time point of a stage to a starting time point of a next stage;

wherein the processor is configured to execute the instructions stored in the memory to:

determine, according to the launching time of each of the plurality of stages of the process, the display schemes corresponding to each of the plurality of stages of the process; and display the animations according to the determined display schemes corresponding to each of the plurality of stages of the process in order in the process of launching the specified application; and wherein the processor is configured to execute the instructions stored in the memory to:

in response to determining that launching time of a first stage is less than or equal to a preset threshold, determine that a first display scheme corresponds to the first stage and display a first picture according to the first display scheme; and in response to determining that launching time of a second stage is greater than the preset threshold, determine that a second display scheme corresponds to the second stage and display a second animation according to the second display scheme.

6. The device of claim 5, the processor is configured to execute the instructions stored in the memory to:

adjust, according to the launching time of each of the plurality of stages, the display schemes corresponding to each of the plurality of stages.

7. The device of claim 6, wherein the processor is configured to execute the instructions stored in the memory to:

in response to determining that launching time of a third stage is less than preset display time of a third animation according to a third display scheme corresponding to the third stage, perform at least one of: increasing a display speed of a first plurality of picture frames of the third animation corresponding to the third stage or skipping a second plurality of picture frames of the third animation corresponding to the third stage; and in response to determining that launching time of a fourth stage is greater than preset display time of a fourth animation according to a fourth display scheme corresponding to the fourth stage, perform at least one of: decreasing a display speed of a third plurality of picture frames of the fourth animation corresponding to the fourth stage or repeating displaying a fourth plurality of picture frames of the fourth animation corresponding to the fourth stage.

8. The device of claim 5, wherein the specified application comprises a booting application of a projector.

9. A projector, comprising: a projection light machine and a controller;
wherein the projection light machine is configured to perform a projection display; and
the controller is configured to
receive a launching instruction for launching the projector, launch the projector according to the launching instruction, and display, in a process of launching the projection light machine of the projector, animations according to display schemes corresponding to a plurality of stages of the process, wherein different animations are displayed according to different display schemes corresponding to different stages of the plurality of stages for a user to distinguish the different stages of the plurality of stages, and a display scheme for each stage is determined in response to in response to launching time of each of the plurality of stages;
wherein the launching time of each of the plurality of stages is time from a starting time point of a stage to a starting time point of a next stage;
wherein the controller is configured to
determine, according to the launching time of each of the plurality of stages of the process, the display schemes corresponding to each of the plurality of stages of the process; and
display the animations according to the determined display schemes corresponding to each of the plurality of stages of the process in order in the process of launching the specified application; and
wherein the controller is configured to
in response to determining that launching time of a first stage is less than or equal to a preset threshold, determine that a first display scheme corresponds to the first stage, and displaying a first picture according to the first display scheme; and
in response to determining that launching time of a second stage is greater than the preset threshold, determine that a second display scheme corresponds to the second stage, and displaying a second animation according to the second display scheme.

10. A non-transitory computer-readable storage medium, configured to store computer-executable instructions for executing the method of claim 1.

* * * * *